United States Patent

[11] 3,570,367

| [72] | Inventors | Johannes Looman;<br>Friedrich Striepe, Friedrichshafen,<br>Germany |
|---|---|---|
| [21] | Appl. No. | 719,394 |
| [22] | Filed | Apr. 8, 1968 |
| [45] | Patented | Mar. 16, 1971 |
| [73] | Assignee | Zahnradfabrik Friedrichshafen<br>Akliengesellschaft, |
| [32] | Priority | Apr. 8, 1967 |
| [33] | | Germany |
| [31] | | Z12788 |

[54] GEAR-HOBBING MACHINE
4 Claims, 6 Drawing Figs.

[52] U.S. Cl. .................................................... 90/4,
                                                              90/7
[51] Int. Cl. .................................................... B23f 5/20,
                                                              B23f 9/04

[50] Field of Search .......................................... 90/8, 7, 4

[56] References Cited
UNITED STATES PATENTS

| 1,820,409 | 8/1931 | Trbojevich | 90/4 |
|---|---|---|---|
| 2,507,725 | 5/1950 | Leuthold | 90/8 |

FOREIGN PATENTS

| 243,514 | 1912 | Germany | 90/4 |
|---|---|---|---|
| 541,693 | 4/1956 | Italy | 90/7 |

*Primary Examiner*—Gil Weidenfeld
*Attorney*—Albert M. Zalkind

ABSTRACT: A gear-hobbing machine having a gear cutter supported for adjustments along its own axis, about an axis perpendicular to its own axis and along the second mentioned axis to obtain a desired cutting clearance angle between the gear cutter and a gear blank.

Patented March 16, 1971

INVENTORS:
Johannes Looman
Friedrich Striepe
ATTORNEY:

GEAR-HOBBING MACHINE

The invention relates to gear hobbing machines of a type shown in our previously filed U. S. Patent application Serial No. 586,327 filed Sept. 27, 1966, now U. S. Patent No. 3,399,599 and assigned to the present assignee. The present invention constitutes a simplification of the machine disclosed in the prior filed application in that the tool head need not be mounted at double-tilting angles but only at a single-tilting angle. The particular innovation by which this is brought about resides in the displacement of the rotary cutter, which may be cylindrical or conical, along its axis to a cutting position which is at a fixed distance from the usually centrally disposed cutting position in which the common perpendicular line to both tool and work axes is in a plane containing the centers of all front-cutting edges of the tool, whereby the cutting faces of the teeth are at a clearance angle to the surface of the gear being hobbed. The invention is usable for cutting gears having internal or external teeth, either straight or slanted and once the axis of the rotary cutter has been set for a particular tilting angle with respect to the work axis no further angular adjustment is necessary.

Briefly, the invention contemplates a tool head tiltable in a single plane to fix the cutting angle of the rotary tool with respect to the vertical axis of the work and wherein the tool axis is displaced radially with respect to the work axis in parallel planes but at an angle thereto and the tool is adjustable along its axis, the axial positioning of the tool being precisely effected by an optical device.

A description of the invention now follows in conjunction with the appended drawing in which.

Figure 1:
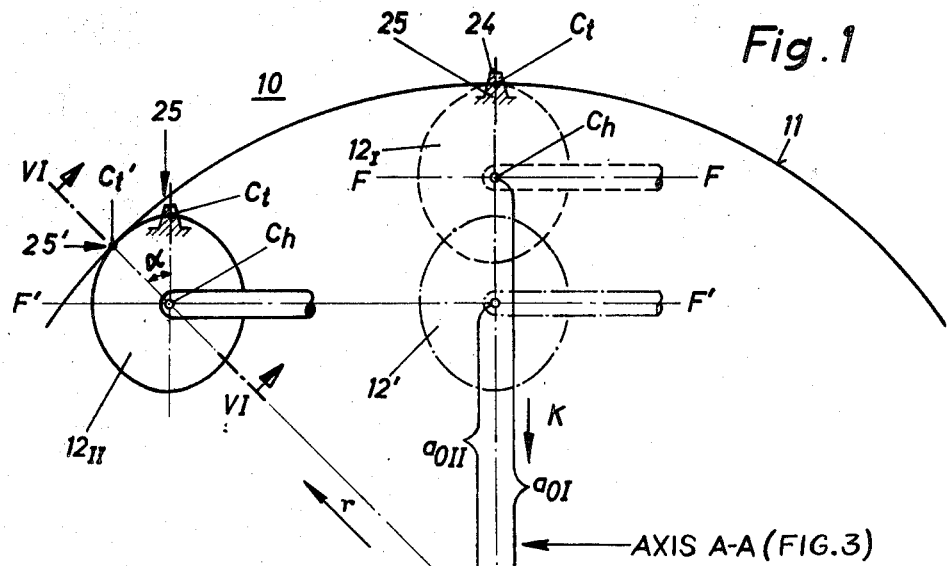
FIG. 1 is an plan view showing a gear blank to be provided with internal teeth and the relationship of the rotary cutting tool with respect thereto.
Figure 5:
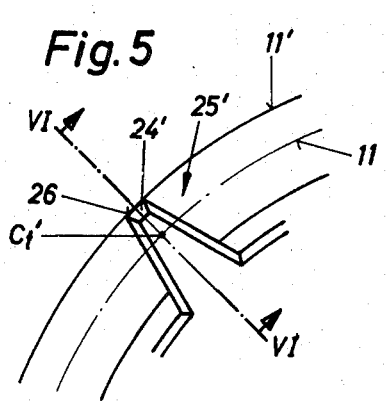
FIG. 5 is a detail view of FIG. 1 on an enlarged scale.

Referring to FIGS. 1, 2, 5 and 6, a gear blank 10 is illustrated having a pitch cylinder 11 and dedendum 11′ wherein the blank is to be hobbed with straight teeth with a cylindrical rotary cutter 12. Accordingly, it will be appreciated that some of the material of the gear blank has been omitted for clarity in order to emphasize the relationship of the pitch circle and the lateral and front cutting faces such as the front face 24 of a cutting tooth 25 which is in full mesh with the gear blank.

Drive means 30 are provided to rotate the cutter 12 in a timed relation with the gear blank 10 about its axis. Shaft-reciprocating means 31 are provided to reciprocate the cutter up and down. Such means are well known in the art.

The ellipses in FIG. 1 represent the pitch circle of the cutting tool 12 in three positions, on which pitch circle points $C_t$ are aligned with the centers of all front cutting edges 26 (FIG. 5) of tool 12; the points, $c_h$ being the center of said pitch circle. The line of intersection between the pitch cylinder of tool $12_{II}$ and the center plane of tooth 25′ in full mesh with the work appears as a point $c_t′$ in FIG. 1. The center of the front cutting edge 26 (FIG. 5) of tooth 25′ is located on the dedendum cylinder 11′ of the work piece. In FIG. 1, the position $12_I$ of the rotary cutter is shown at a distance $a_{oI}$ from the work axis W. This is the shortest distance between the axis F-F of the cutter and the work axis W (W-W, FIG. 2) wherein it will be understood that these axes are spacedly skewed at an angle $\gamma'$ with respect to each other. The distance $a_{oI}$ is the length of the common perpendicular line to both axes, and is represented on FIG. 2 by the point $a_o$, the crossover point of the skewed relationship.

A cutter in the position $12_I$ could not be used for gear hobbing because there is no clearance angle between the front face and lateral flanks of the teeth of the cutting tool and the flanks of the gear teeth of the work. In order to compensate for this, some change must be made for providing the proper clearance angle omega (FIG. 6) in addition to the fixed angle $\gamma'$ as shown in FIG. 2 which latter angle is determined to provide a cutting component for the relative movement between the work and the cutter teeth during rotation in synchronized cutting engagement, a feature not new per se.

It has been found that by decreasing the distance $a_{oI}$ between the axes F-F and W-W to $a_{oII}$ by shifting the tool head 14 (FIG. 3) on axis A-A in the direction of the vertical arrow K lying in the drawing plane of FIG. 1, and by shifting the holder 21 together with the cutter shaft 20 along axis F′-F′ by a distance C (FIG. 2), the cutting surface 24′ of tooth 25′ (FIGS. 5 and 6) of the cutter are caused to incline by a cutting clearance angle $\Omega$ (omega) (FIG. 6) with respect to the surface of the work to be hobbed. In other words, by reducing the distance $a_{oI}$ to the distance $a_{oII}$ (FIG. 1) and repositioning the cutter to new position $12_{II}$ by a distance C on its axis F′-F′ full cuts can be taken with a clearance angle $\Omega$ between cutting surfaces and the work to be hobbed. This is effected with a simplified machine which has only one tilt adjustment for the cutter axis, i.e., for the angle gamma prime the the reduction of distance on axis A-A from $a_{oI}$ to $a_{oII}$ provides for tangency of the pitch circles of the work and cutter.

Figure 2:
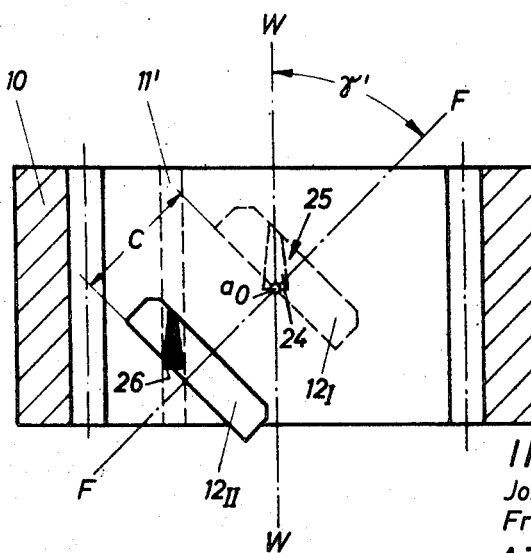
FIG. 2 is a diagrammatic view taken at right angles to FIG. 1 looking in an upward direction and illustrating the rotary tool positions corresponding to the positions of FIG. 1.

Whereas the common perpendicular line to axis F-F and W-W (point $a_o$ of FIG. 2) intersects the center $C_T$ on the pitch circle of the cutting tooth 25 in the original position $12_I$ of the cutter and it also intersects the rotary axis F-F, it does not intersect that center in the tool position $12_{II}$, due to the fact that the tool has been displaced on its axis F′-F′ by the distance C with respect to the crossover point $a_o$ between the two axes in the orientation of FIG. 2, and the adjustment on axis A-A as described above compensates for this.

Figure 6:
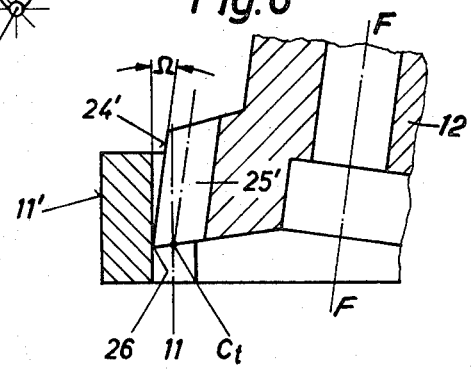
FIG. 6 is a partial section on line VI-VI in FIG. 5.

Also in position $12_{II}$ of the cutting tool the surfaces of tooth 25 are still perpendicular to the surface of the work to be hobbed, tooth 25 however having come out of mesh. Viewed in the direction of radius r of pitch cylinder 11, another tooth 25′ which is angularly distant by an angle $\alpha$ from tooth 25, is in full mesh with the gear blank. Due to the tool axis F′-F′ being inclined to the work axis W-W by the tilting angle $\gamma'$ the front surface 24′ of cutting tooth 25′ is no longer parallel to W-W but inclined thereto by a clearance angle $\Omega$ (FIG. 6). The lateral flanks of tooth 25′ due to their tapering angle likewise are at a clearance angle which is calculated from the tapering angle and clearance angle $\Omega$.

The machine of the invention is adjustable so as to position a cutter by any desired amount C along the axis F-F dependent upon the size relationships of the gear blank and the rotary cutting tool and also to adjust the distance between axes F-F and W-W.

Figure 3:
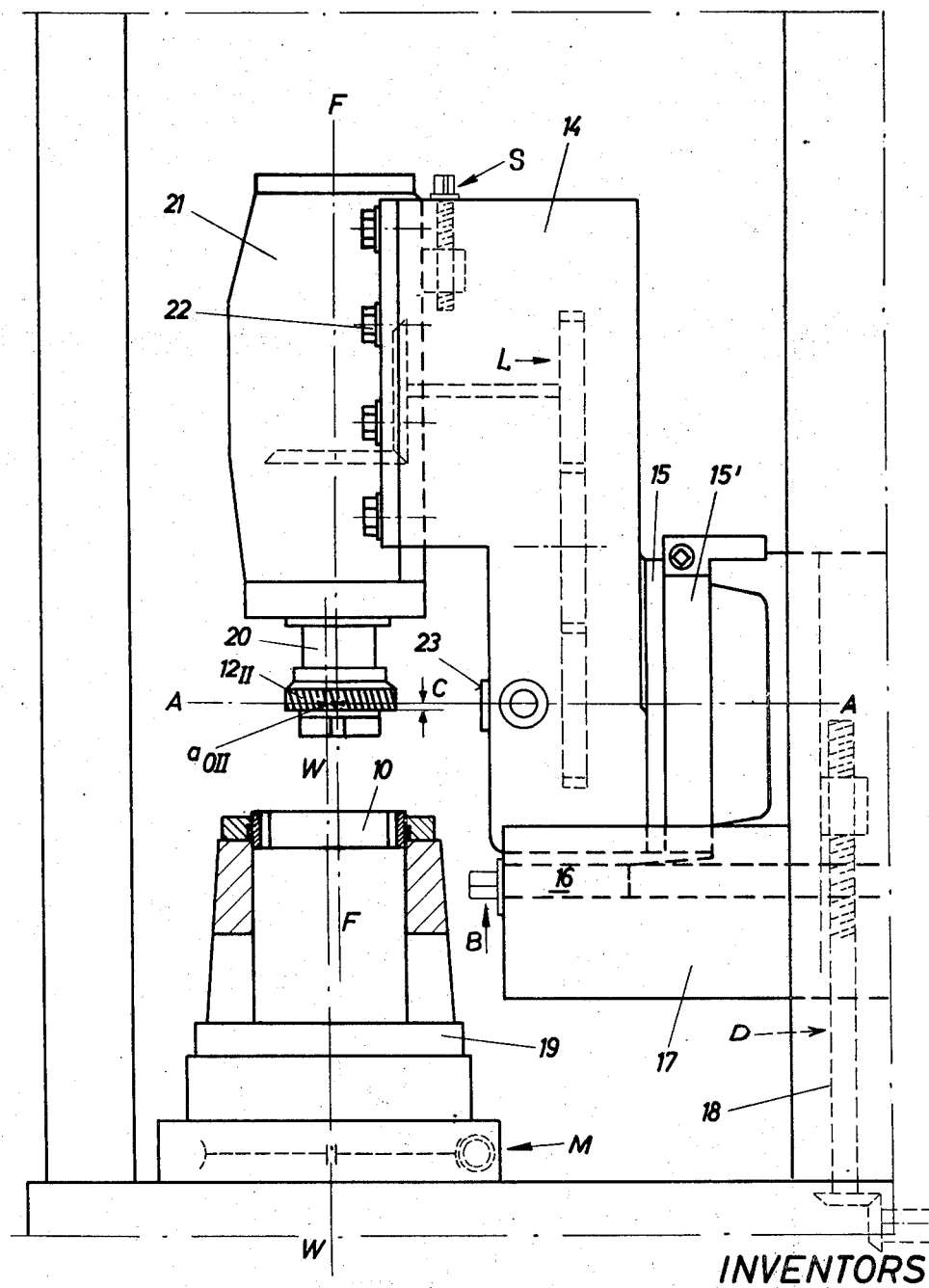
FIG. 3 is a side elevation of a hobbing machine utilizing the tool of the invention.
Figure 4:
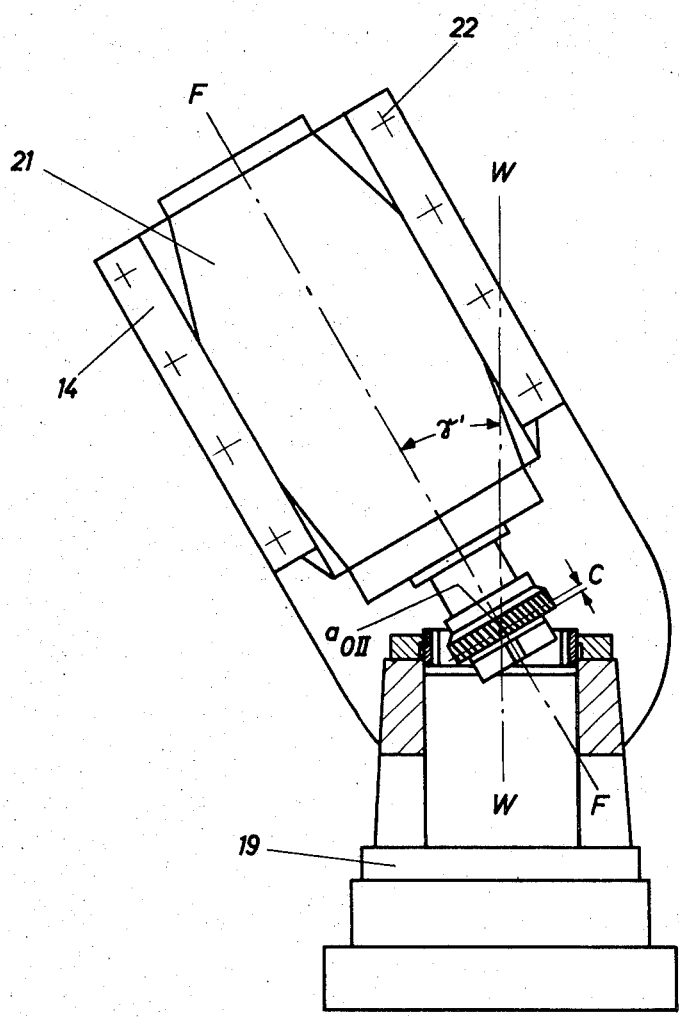
FIG. 4 is a front view of the machine of FIG. 3.

Referring now to FIGS. 3 and 4, the machine of the invention is disclosed, the axes F-F and W-W and angle $\gamma'$ being illustrated together with an axis A-A about which the tool head 14 can be rotated on flange 15 to be locked in a rotative position by conventional mechanism 15′. Head 14 is also translationally adjustable in a direction parallel to axis A-A, being mounted on a carriage 16 in turn mounted on a carriage feed mechanism 17 carried in machine frame 18. The preceding general description for adjustability of carriage 16 and feed mechanism 17 is found in many machines and accordingly no details need be given. The reciprocal adjustment on axis A-A changes the perpendicular distance between axes F-F and W-W, e.g., from $a_{oI}$ to $a_{oII}$, as found in FIGS. 1 and 2.

The tool head 14 carries a holder 21 which carries the cutter shaft 20. Housing 21 is mounted at the tool head 14 and can be adjusted thereon along axis F-F, the axial adjustment realizing a predetermined axial distance C (FIG. 2) of the cutter with respect to the axis A-A and the crossover point $a_o$ aligned thereto. The holder 21 is adjustable by means of being bolted to the tool head 14 by screw bolts 22 in a readily understood manner.

An optical sighting device 23 on the axis A-A is carried by the tool head 14 so that the tool can be set with precision as to the distance C. Such device can be of conventional nature, for example, as shown in the Looman et al. patent referred to hereinabove and also in British patent 1,100,980. In the present case both horizontal and vertical scales would be preferred in conjunction with the sighting device so as to check both the horizontal and vertical positioning of the center of a tooth edge 26 on axis A-A for a starting or "zero position" preceding adjustment for the distance C.

The cutter is thus set with respect to the work blank 10 carried in the usual holder 19 and the rotation of holder 19 and shaft 20 is a matter of gearing well known in the art.

While the view of FIG. 4 would make it appear that the teeth of the cutter are slanted with respect to the axis W-W it will be appreciated that it is the teeth on the opposite side of the tool which do the cutting and therefore these teeth would be slanted in the opposite direction so as to be parallel to the axis W-W, their cutting edges being in planes normal to the axis W-W.

The amount of reciprocal adjustment of the cutter on axis A-A and on axis F-F is matter of prerecorded tables calculated conventionally for different kinds of hobbing jobs to which the invention is suited.

As a matter of summating the disclosure, the steps followed in practicing the invention in the machine disclosed or any equivalent machine which will be apparent to persons skilled in the art from the description above are set forth briefly as follows:

a. Set the cutter so that a starting position or zero position is effected by adjustment rotationally and translationally in order to bring the center of any tooth edge 26 on axis A-A, preferably using a sighting device of any suitable kind for convenience and accuracy.

b. Adjust the cutter translationally on axis F-F for a distance C depending upon the needs for cutter clearance in the hobbing to be performed.

c. Translate the cutter in the direction of the axis A-A through the necessary distance from the position it was at at the starting or zero position ($a_{oI}$) to he final position ($a_{oII}$) to effect pitch circle tangency.

The various adjustments of the machine utilize mechanisms which are generally conventional except for the translational head 21 and its holding screws 22 in order to effect the adjustment C. Preferably a screw S may be provided for such adjustment while a screw B may be provided for such adjustment while a screw B may be provided for adjustment of the carriage mechanism 16—17 to adjust the cutter in accordance with (c) above. It will, of course, be understood that verniers can be utilized on machines in conjunction with the aforementioned adjusting elements for accurate measuring. For coarse adjustment and drive, a screw D can be utilized for moving head 14 vertically. A drive L of conventional nature for rotating the cutter and a synchronized drive M likewise of conventional nature for rotating the work would normally be components of the machine all as constructed in accordance with well-known principles.

We claim:

1. A gear-hobbing machine comprising a tool head, means on said tool head for supporting a toothed gear cutter for rotation about its axis (F-F), means for adjustably positioning said gear cutter along said axis (F-F), means for rotatably supporting a gear blank about an axis (W-W) being transverse to said gear cutter axis, means for adjustably positioning said tool head about a third axis (A-A) which is substantially perpendicular to said gear cutter and said gear blank axes, means for adjustably positioning said tool head along said third axis; whereby a predetermined angle (gamma prime) can be set between said transverse axes and said gear cutter can be positioned along its axis (F-F) to an initial cutting position to obtain a desired cutting clearance angle (omega) between a tooth on said gear cutter and the gear blank, and said gear cutter axis (F-F) can be spaced from said gear blank axis (W-W) a desired distance along said third axis (A-A) to effect tangency of the pitch circles of the gear cutter and gear blank during a cutting operation, and means for feeding said cutter in a direction parallel to the gear blank axis during said cutting operation.

2. A gear-hobbing machine as set forth in claim 1, including means for sighting a central portion of said gear cutter tooth to coincide with said third axis to establish a first position from which gear cutter is adjusted a predetermined distance (c) along its axis to said initial cutting position.

3. A method of hobbing teeth on a gear blank using a rotatable tooth gear cutter comprising the following steps:
  a. orienting the axis (F-F) of said gear cutter and the axis (W-W) of said gear blank to be transverse to each other so that a predetermined angle (gamma prime) will be formed between said transverse axes,
  b. positioning the gear cutter along its axis to a desired initial cutting position with respect to the gear blank to provide a cutting clearance angle (omega) between a tooth on the gear cutter and the gear blank,
  c. positioning the gear cutter relative to the gear blank so that their axes are spaced a predetermined distance apart along a third axis (A-A) being substantially perpendicular to said axes, whereby tangency of the pitch circles of said gear cutter and said gear blank will be established during a cutting operation, and
  d. feeding said gear cutter in a direction parallel to the axis of the gear blank during said cutting operation.

4. The method of claim 3, wherein step (b) includes centering said gear cutter tooth on said third axis (A-A) and subsequently translating said gear cutter along its axis a predetermined distance (c) to said desired initial cutting position.